Figure 1:
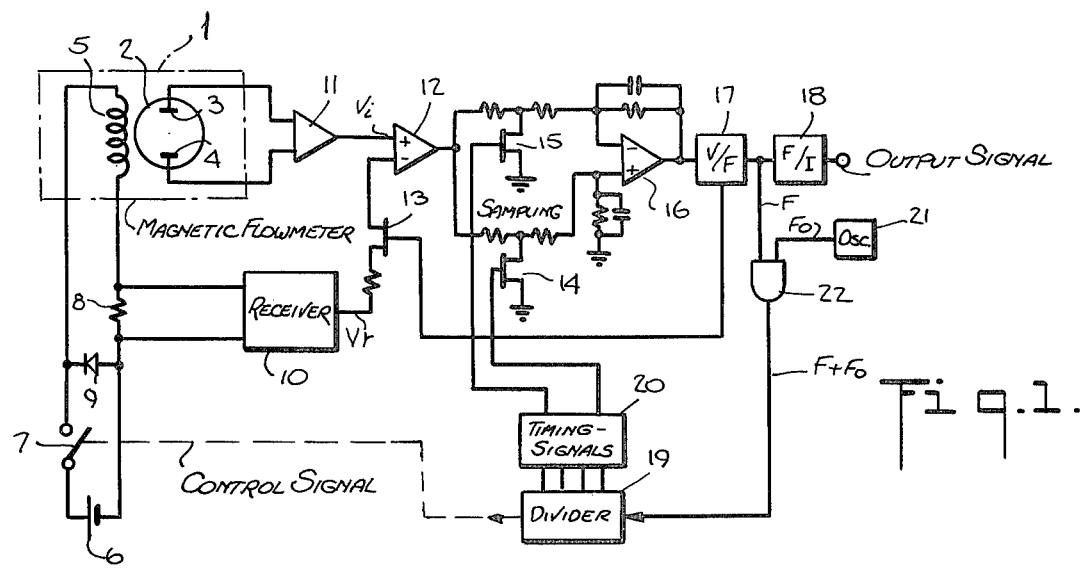

United States Patent [19]

Kayama et al.

[11] 4,193,298
[45] Mar. 18, 1980

[54] EXCITATION SYSTEM FOR ELECTROMAGNETIC FLOWMETER

[75] Inventors: Nagaoki Kayama; Kazuie Suzuki, both of Tokyo, Japan

[73] Assignee: Hokushin Electric Works, Ltd., Tokyo, Japan

[21] Appl. No.: 935,133

[22] Filed: Aug. 21, 1978

[30] Foreign Application Priority Data

Aug. 24, 1977 [JP] Japan ............... 52-100623

[51] Int. Cl.$^2$ .............................. G01F 1/60
[52] U.S. Cl. .............................. 73/194 EM
[58] Field of Search ..................... 73/194 EM

[56] References Cited

U.S. PATENT DOCUMENTS 4,089,219   5/1978   Suzuki ............... 73/194 EM

FOREIGN PATENT DOCUMENTS 462085   5/1973   U.S.S.R. .............. 73/194 EM

Primary Examiner—Charles A. Ruehl
Attorney, Agent, or Firm—Michael Ebert

[57] ABSTRACT

A technique for exciting the electromagnet of a magnetic flowmeter in which a fluid to be metered is conducted through a flow tube having detecting electrodes, the fluid intercepting a magnetic field established by the electromagnet to induce a signal in the electrodes indicative of flow in a high flow-rate range as well as in a low flow-rate range. In this technique, derived from the electrode signal is a control signal whose frequency is a function of the velocity of the fluid passing through the tube, the excitation current supplied to the electromagnet being governed by the control signal so that it has a frequency which is higher in the high flow-rate range and lower in the low flow-rate range.

5 Claims, 3 Drawing Figures

EXCITATION SYSTEM FOR ELECTROMAGNETIC FLOWMETER

BACKGROUND OF INVENTION

This invention relates generally to an improved excitation technique for an electromagnetic flowmeter, and more particularly to a method and a system based thereon to effect automatic control of the frequency of the excitation current supplied to the electromagnet of the flowmeter so that it is higher in a high flow-rate range and lower in a low flow-rate range.

In an electromagnetic flowmeter, a magnetic field is established by an electromagnet having an excitation coil, the field being intercepted by a fluid passing through a flow tube to induce a signal between a pair of diametrically-opposed electrodes, which electrode signal is indicative of flow rate.

In flow rate measurement utilizing a magnetic flowmeter, it has heretofore been the practice to make use of an a-c excitation current in order to eliminate polarization effects which take place between the electrodes and the fluid being metered. However, when employing the a-c magnetic field, eddy currents are generated that are 90° out of phase with the magnetic flux.

Although, in an ideal state, these eddy currents in the cross-sectional plane of the flow tube which includes both electrodes, flow symmetrically with respect to the tube's axis, in actual practice these currents are asymmetrical with respect to this axis because of an unbalance in the geometry of the tube. This gives rise to unbalanced eddy currents which are changed by the capacitance between the electrodes and the fluid into components that are in-phase with the detected signal. These in-phase components result in zero drift, in that the eddy currents fluctuate from time to time.

With a view to overcoming this drawback, it has heretofore been the practice to provide an excitation system in which the excitation frequency is decreased to a value below the frequency of the commercial power line in order to reduce the level of eddy currents generated in the flowmeter. However, when the excitation frequency is so decreased, it becomes impossible to measure the flow rate of fluids whose velocity lies in a high flow-rate range.

SUMMARY OF INVENTION

In view of the foregoing, the main object of this invention is to provide an improved excitation technique and a system based thereon whereby a higher response is obtained from a magnetic flowmeter in the high flow-rate range, the meter having good stability in the flow-rate range.

Briefly stated, this object is attained in a technique for exciting the electromagnet of a magnetic flowmeter in which a fluid to be metered is conducted through a flow tube having detecting electrodes, the fluid intercepting a magnetic field established by the electromagnet to induce a signal in the electrodes indicative of flow in a high flow-rate range as well as in a low flow-rate range. In this technique, derived from the electrode signal is a control signal whose frequency is a function of the velocity of the fluid passing through the tube, the excitation current supplied to the electromagnet being governed by the control signal so that it has a frequency which is higher in the high flow-rate range and lower in the low flow-rate range.

OUTLINE OF DRAWINGS

Figure 2:
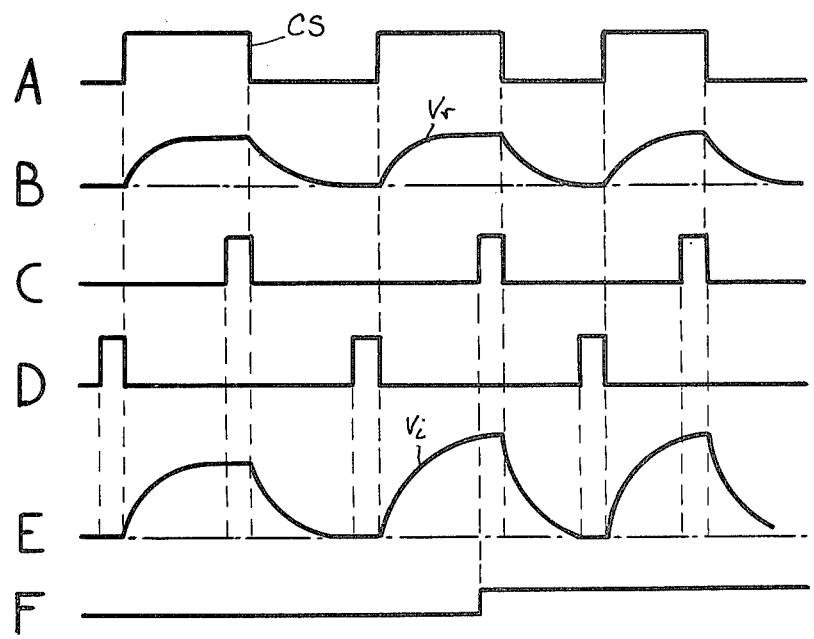
Figure 3:
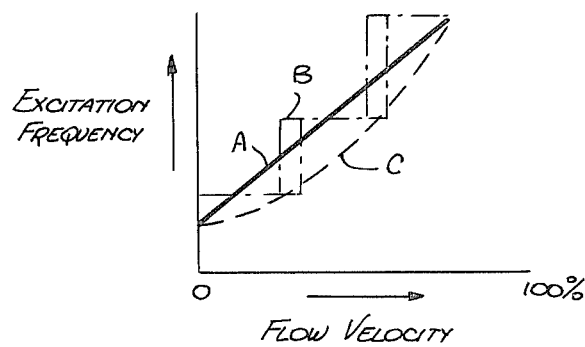

For a better understanding of the invention as well as other objects and further features thereof, reference is made to the following detailed description to be read in conjunction with the accompanying drawings, wherein:

FIG. 1 is a schematic diagram of a magnetic flowmeter that includes an excitation system adapted to carry out a technique in accordance with the present invention;

FIGS. 2 (A) to 2 (F) are waveforms illustrating the operations of the magnetic flowmeter; and FIG. 3 is a diagram graphically illustrating the relationship between excitation frequency and mean flow velocity.

DESCRIPTION OF INVENTION

The System

FIG. 1 schematically illustrates a magnetic flowmeter arrangement that includes an excitation system in accordance with the invention. The arrangement includes a magnetic flowmeter 1 provided with a flow tube 2 through which the fluid to be metered is conducted, a pair of electrodes 3 and 4 mounted at diametrically-opposed positions on tube 2, and an electromagnet having an excitation coil 5 acting to establish a magnetic field normal both to the longitudinal flow axis of the tube and to a transverse axis extending between electrodes 3 and 4.

A resistor 8 connected in series with the excitation circuit that includes coil 5, a commercial power line source 6 and a switch 7, serves to detect fluctuations in the excitation current to produce a reference signal. A diode 9 connected across the excitation circuit functions to discharge energy generated by the counter electromotive force produced in excitation coil 5. A signal-receiving circuit 10 serves to amplify the reference signal developed across resistor 8 to produce a reference signal $V_r$.

When a fluid passing through tube 2 intersects the magnetic field, a voltage proportional to the volumetric flow rate is induced in the fluid which is transferred to electrodes 3 and 4 to yield a flow rate signal. The detected signal $V_i$ is amplified by a pre-amplifier 11 connected to the electrodes and then applied to the non-inverting input of a deviation amplifier 12 whose inverting input is connected through a semiconductor multiplier 13 to receiving circuit 10.

The output of deviation amplifier 12 is applied through a sampling circuit constituted by semiconductor electronic switches 14 and 15 to each input terminal of a differential amplifier 16 which acts to determine the difference between the signals applied thereby and for smoothing. The output of amplifier 16 is fed to a voltage-to-frequency converter 17 whose output terminals are connected to a frequency-to-current converter 18 as well as to one of the inputs of an AND circuit 22 whose other input terminal is connected to a stable oscillator 21. The output of AND circuit 22 is connected to a frequency divider 19 whose output terminals are connected to a timing-signal generating circuit 20.

The arrangement is such that excitation circuit switch 7, semiconductor multiplier 13, and sampling semiconductor switches 14 and 15 are "on-off" controlled by the respective outputs of frequency divider 19, voltage-to-frequency converter 17 and timing signal generator 20.

Operation

The operation of the magnetic flowmeter in FIG. 1 will now be explained in connection with FIGS. 2(A) to (F). FIG. 2 (A) is a waveform showing the "on-off" operation of switch 7; FIG. 2 (B) is the waveform of the signal $V_r$ derived from receiver circuit 10; FIGS. 2 (C) and (D) are waveforms illustrating the "on-off" operations of sampling switches 14 and 15; FIG. 2 (E) is a waveform of the flow rate signal $V_i$ yielded in the output of pre-amplifier 11; while FIG. 2 (E) is a waveform showing the output of differential amplifier 16. Although this output does not actually change in the step-like manner shown in FIG. 2 (F) because of the time-constant of amplifier 16, the operation is nevertheless illustrated in this manner in order to simplify the explanation.

The basic operation of a magnetic flowmeter having an excitation circuit in accordance with the invention is as follows: When switch 7 is "on-off" controlled, as shown in FIG. 2 (A), an excitation current having the waveform shown by FIG. 2 (B), flows through excitation coil 5, and a reference signal $V_r$ proportional to the excitation current and reflecting fluctuations therein is detected by resistor 8 and receiver circuit 10.

Now we shall explain in greater detail the function of the excitation circuit. Applied to deviation amplifier 12 are the flow rate signal $V_i$ from pre-amplifier 11 and the product obtained from multiplier 13 of the reference signal $V_r$ and the output frequency F of voltage-to-frequency converter 17. Thus, the relationship of the signals at the input terminal of amplifier 12 can be expressed by the following equation:

$$V_i = V_r F \quad (1)$$

Equation (1) can be rewritten as follows;

$$F = V_i / V_r \quad (2)$$

As a result, a frequency signal (F) that is free from fluctuations in the excitation current can be obtained.

From deviation amplifier 12, the output yielded in the excitation period and the output yielded in the non-excitation period are applied selectively to differential amplifier 16 through sampling switches 14 and 15 in a manner whereby the flow signal sampled in the non-excitation period is subtracted from the flow signal sampled in the excitation period, thereby eliminating unwanted d-c noise included in the output of deviation amplifier 12. To this end, the timing of the sampling effected by semiconductor switch 14 or 15 is arranged so that the flow signal is sampled in its substantially constant amplitude state.

The frequency of the control signal CS for driving switch 7, which is shown by a solid line A in FIG. 3, is determined by dividing the sum of the constant frequency $F_o$ supplied by local oscillator 21 and the output frequency F of voltage-to-frequency converter 17. This is accomplished by supplying the beat frequency $F+F_o$ to divider 19. As shown by this figure, the excitation frequency which is determined by the frequency of control signal CS changes in accordance with the flow velocity. Frequency $F_o$ from the local oscillator functions to bias the excitation frequency so that excitation by a fixed low frequency continues even when the flow rate is zero.

With an increase in the mean flow velocity, the interval for sampling the flow rate signal and the interval for sampling the reference signal are made narrow, whereas with a decrease in the main velocity, the sampling interval is expanded.

Accordingly, a magnetic flowmeter having an excitation system in accordance with the invention has the following features:

(1) When the mean flow rate of liquid flowing in tube 2 lies in a low flow-rate range and the accuracy necessary for flow rate measurement cannot be obtained unless zero drift is reduced considerably, the excitation frequency is then made low, whereby the "on" period of switch 7 is widened and it becomes possible to sample the flow signal during its substantially constant amplitude state wherein the noise voltage resulting from fluctuations in the excitation current becomes minimal. In this way, highly precise flow rate measurement is made possible.

(2) When the mean flow rate lies in a high flow-rate range and the accuracy necessary for flow rate measurement can be obtained without suppressing the zero drift to the extent required when operating in the low flow-rate range, the excitation frequency is made high, and, in turn, the sampling interval is made narrow. As a result, a flow rate measurement which has a higher response can be attained with an accuracy essentially identical to that in the low flow-rate range.

Thus highly precise flow-rate measurement can be carried out with an error that is within a fixed limit for every measurement. This does not mean, however, that the error is reduced to a fixed value within the full scale of the flow signal.

Since the response of the meter changes in proportion to the volumetric flow rate, desirable response characteristics can be obtained even though the flow rate signal undergoes large changes.

Although this invention has been explained for a situation in which the excitation frequency changes linearly in proportion to the mean flow rate, as shown by the solid line A in FIG. 3, the invention may be used in a situation where the curve showing the relationship between excitation frequency and mean flow rate changes in a step-like manner, as shown by a dotted line B in FIG. 3, or in a situation in which the excitation frequency increases continuously with an increase of the mean flow rate, as shown by curve C in FIG. 3.

While there has been shown and described a preferred embodiment of an excitation system for electromagnetic flowmeter in accordance with the invention, it will be appreciated that many changes and modifications may be made therein without, however, departing from the essential spirit thereof.

We claim:

1. A method for exciting the electromagnet of a magnetic flowmeter in which a fluid to be metered is conducted through a flow tube provided with detecting electrodes, the fluid intercepting a magnetic field established by the electromagnet to induce a signal in the electrodes indicative of flow rate in a high flow-rate range as well as in a low flow-rate range, the method comprising the steps of:

A deriving from the electrode signal a control signal having a frequency which is a function of the velocity of the fluid passing through the tube;

B supplying excitation current to the electromagnet in the form of a direct current which is periodically interrupted; and C governing the frequency of interruption of the excitation current in accordance with the control signal so that the interruption frequency of the excitation current is higher in the high flow-rate range and lower in the low flow-rate range.

2. A method as set forth in claim 1, wherein said control signal is derived by mixing a first signal whose frequency is proportional to the electrode signal which depends on the flow rate and a second signal having a constant frequency to produce a beat signal which is divided in frequency to yield said control signal, said second signal biasing the control signal whereby said control signal at zero flow rate has the divided frequency of said second signal.

3. A system for exciting the electromagnet of a magnetic flowmeter in which a fluid to be metered is conducted through a flow tube provided with detecting electrodes, the fluid intercepting a magnetic field established by the electromagnet to induce a signal in the electrodes indicative of flow rate in a high flow-rate range as well as in a low flow-rate range, said system comprising:

A means coupled to said electrodes to derive from the electrode signal a control signal having a frequency which is a function of the velocity of the fluid passing through the tube;

B means to supply an excitation current to said electromagnet in the form of a direct current which is periodically interrupted; and C means governing the frequency of interruption of the excitation current in accordance with the control signal so that the interruption frequency of the excitation current is higher in the high flow-rate range and lower in the low flow-rate range.

4. A system as set forth in claim 3, wherein said means to supply said excitation current to said electromagnet is constituted by a power supply and an on-off switch interposed between said supply and said electromagnet, said switch being periodically actuated in accordance with said control signal.

5. A system as set forth in claim 4, wherein said means to derive the control signal from said electrode signal includes a voltage-to-frequency converter to convert the electrode signal into a first signal whose frequency is proportional thereto, a local oscillator having a constant frequency to produce a second signal, means to mix the first and second signal to produce a positive beat signal, and means to divide the beat signal to produce the control signal.

* * * * *

UNITED STATES PATENT OFFICE
CERTIFICATE OF CORRECTION

Patent No. 4,193,298  Dated March 18, 1980

Inventor(s) Nagaoki Kayama and Kazuie Suzuki

It is certified that error appears in the above-identified patent and that said Letters Patent are hereby corrected as shown below:

Column 3, line 11, "E" should have read -- F --

Column 3, line 35 "$V_r F$" should have read -- $V_r \cdot F$ --

Signed and Sealed this

Twenty-fourth Day of June 1980

[SEAL]

Attest:

SIDNEY A. DIAMOND

Attesting Officer   Commissioner of Patents and Trademarks